United States Patent [19]

Hanson

[11] Patent Number: 5,761,887
[45] Date of Patent: Jun. 9, 1998

[54] PLATFORM ATTACHMENT FOR LAWN MOWER

[76] Inventor: Ellsworth G. Hanson, 1523 Third Ave. W., Spencer, Iowa 51301

[21] Appl. No.: 633,200

[22] Filed: Apr. 16, 1996

[51] Int. Cl.$^6$ .................. A01D 101/00; A01D 75/00
[52] U.S. Cl. .................. 56/1; 56/2; 56/DIG. 9; 56/16.7; 56/320.1; D34/12; 280/727
[58] Field of Search .................. 56/1, 2, 16.7, 16.8, 56/DIG. 9, DIG. 18, 320.1; 280/727, 47.34, 47.35; D34/17, 12

[56] References Cited

U.S. PATENT DOCUMENTS

| | | | |
|---|---|---|---|
| 1,338,144 | 4/1920 | McNeill | 56/2 |
| 2,326,739 | 8/1943 | Andrews | 56/1 |
| 4,372,064 | 2/1983 | Benenate et al. | 56/2 X |
| 5,485,963 | 1/1996 | Walto et al. | 56/16.8 X |

*Primary Examiner*—Terry Lee Melius
*Assistant Examiner*—Heather Shackelford

[57] ABSTRACT

An attachment to a rotary type lawn mower by which the mower can be used as a lawn cart. The attachment consists of a tray-like shelf attachable to the mower handle and axles to support the shelf above the motor of the mower.

4 Claims, 1 Drawing Sheet

PLATFORM ATTACHMENT FOR LAWN MOWER

BACKGROUND AND SUMMARY OF THE INVENTION

This invention pertains to tools used for household yard care, and more particularly to a carrier for goods and materials used in such yard work and to use an existing wheeled basis for such a carrier.

In the case of the usual household yard, there frequently are times when a small cart would be useful for transporting hand tools such as trowels, weeding tools and the like or for transporting such items as garden stakes, weeds grubbed from a lawn or garden or similar objects.

Frequently such carts are separately available as small wheel barrows, two wheeled carts or similar devices. However, each separate wheeled vehicle adds to the crowding of storage space and it is desirable to reduce such requirements for space to the extent possible.

By the present invention, the utility of a lawn cart is made available without the need for substantial storage space. This is accomplished by combining one common lawn care device—in this case, a rotary mower—with an attachment adapted for carrying tools and the like.

A more complete understanding of the invention may be had from the following description and the figures in which:

DESCRIPTION

Figure 1:
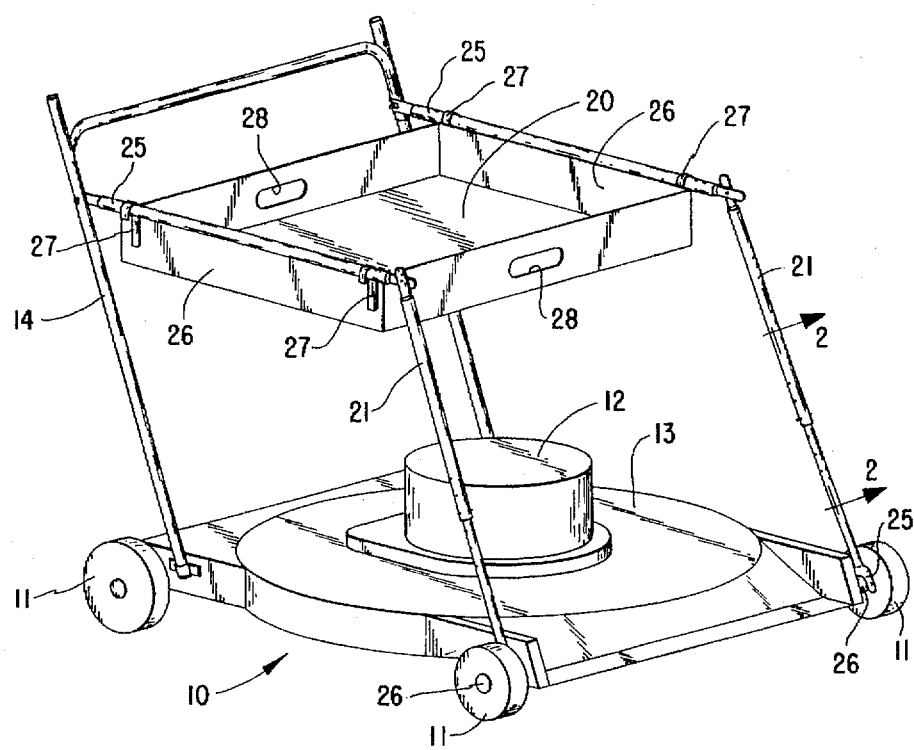
FIG. 1 is a perspective view of the carrier attachment in place on a rotary-type lawn mower.
Figure 3:
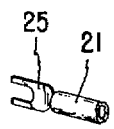
FIG. 3 is plan view of the forked end of the legs of the attachment to an enlarged scale.

Briefly this invention pertains to improvements in lawn care devices, and more particularly to an attachment for such a device to add substantially to its utility. Essentially, the invention is of an attachment to a lawn mower to convert it to a yard cart.

More specifically, and referring to the drawings, the basic device includes an ordinary rotary-type lawn mower 10 which rolls on wheels 11 and is powered by a motor 12 mounted in the deck 13. The mower commonly is pushed, or at least steered—by means of a handle 14.

Figure 2:
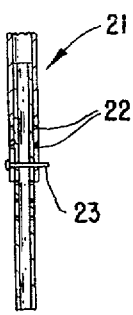
FIG. 2 is a sectional view to an enlarged scale of one leg of the attachment from line 2—2 of FIG. 1.

The device constituting this invention itself includes a platform device 20 which may be in the form a tray, a box or any other desired form supported by legs 21 from the lower. These legs are shown in FIG. 2 may each by a pair of telescoping members provided with a series of holes 22 and a pin 23 extending through one set of holes to provide an adjustable leg.

Each leg 21 is preferably removably attached to the forward end of the mower. The illustrated device includes a fork 25 adapted to embrace the axle 26 of the front wheels of the mower. It is also envisioned that a reduced sized end of the leg could be inserted into a hole in the mower deck 13 to provide an alternate means for removable support of the leg 21.

The legs 21 form the front support for a framework which also includes lateral bars 25 pivotally connected to the legs 21. These bars may be bolted or otherwise fastened to the handle 14 at a point that would keep the bars substantially horizontal. The adjustability of the legs will make that position relatively easy to achieve. In mowers having two-part handles bolted together, the end of the bars 25 may be fastened to the handle by the same bolts that hold the parts of the handle together. Forked ends similar to those on the legs 21 might also be used if desired.

The tray 20 may be a simple flat platform or preferably be formed with sides 26 so that material in the tray will be retained. It may also be permanently fastened to the bars 25. However, it is preferably removable as illustrated. This ready removal is made possible by using curved hangers 27 in the form of hooks extending over and along side of the bars as shown (FIG. 1). By this construction, the tray can be made portable so that it can be carried to location, such as into a garden area, where the rolling cart might not be wanted. Handle openings 28 may be provided to enhance that usage.

The use of the device is obvious from the description. The entire attachment may be readily removable when it is desired to use the mower alone, or just the tray could be removed. When it is to be used as a cart, the tray can be loaded with small hand tools such pruning shears, trowels, hand weeding devices to be carried from this storage place to a garden or other place of use. Cut flowers, waste twigs or other materials could also be put in the tray for moving them to a desired alternative place for proper disposal.

It may be noted that the attachment is useful with push-type mowers or with those which are "self-propelled". The latter type is ordinarily propelled through the rear wheels, and there is no part of the attachment which would interfere with such arrangement. Thus, one might even achieve a powered cart by use of this attachment.

Figure 4:
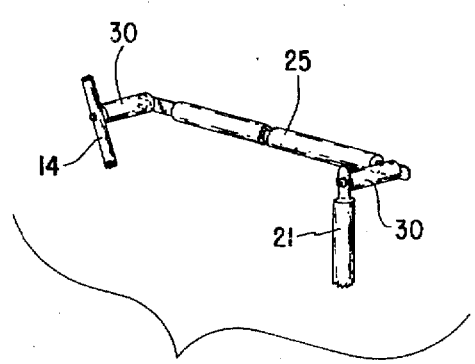
FIG. 4 is a detailed perspective view similar to FIG. 1 of an adjustment alternative

It is also envisioned that a common tray 20 may be used for all mowers regardless of width. To accommodate the variations, a spacer 30 (FIG. 4) may be used between the leg 21 and the bar 25. If necessary, the same type of device may be used between the bar 25 and the handle 14 to accommodate the various sizes of mowers.

I claim as my invention:

1. In combination with a rotary type lawnmower having a steering handle attached to a deck, supporting wheels each journalled on an axle attached to said deck, attachment means comprising a framework including a pair of legs supported from said mower and bars attached at a first end to said legs, said bars extending toward said handle and attached to said handle at a second end of each bar opposite said first end, said legs each being removably engaged with one of said axles and tray means for supporting tools and materials, said tray means being supported from said bars.

2. The combination of claim 1 in which said tray means includes a tray, hooks on said tray, said hooks being removably engaged with said bars.

3. The combination of claim 1 in which spacers between said bars and said handle and between said bars and said legs accommodate the width of the mower.

4. In combination with a rotary type lawnmower having a steering handle attached to a deck, supporting wheels each journalled on an axle attached to said deck, attachment means comprising a framework including a pair of legs supported from said mower deck and bars attached at a first end to said legs, said bars extending toward said handle and attached to said handle at a second end of each bar opposite said first end, said legs being telescopically adjustable, stop means on said legs to hold said legs in an adjusted position, and tray means for supporting tools and materials, said tray means being supported by said bars.

* * * * *